Figure 1:
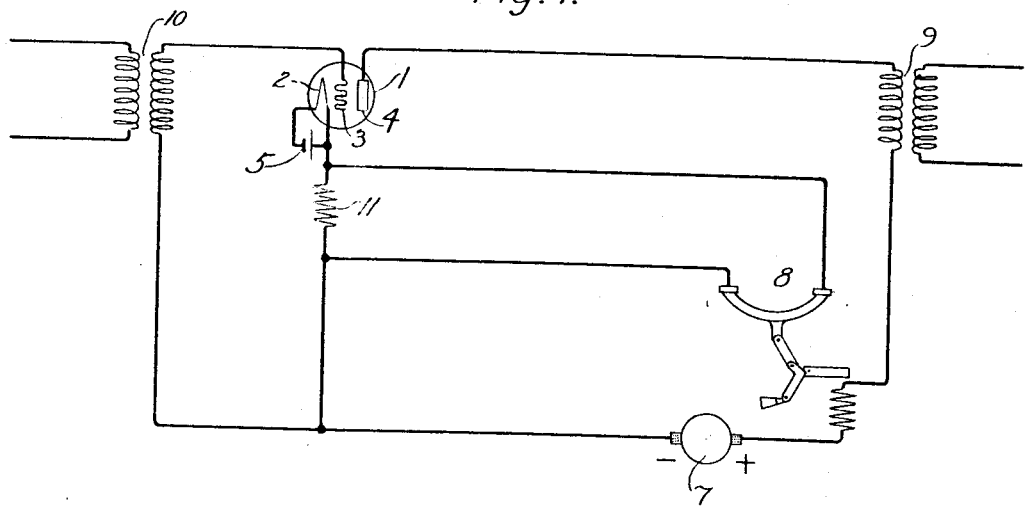

Nov. 6, 1928.

L. M. CLEMENT 1,690,271

METHOD OF AND MEANS FOR PROTECTING ELECTRICAL APPARATUS

Filed Nov. 12, 1923

Inventor
Lewis M. Clement
by  ~~~~ Atty.

Patented Nov. 6, 1928.

1,690,271

UNITED STATES PATENT OFFICE.

LEWIS M. CLEMENT, OF YONKERS, NEW YORK, ASSIGNOR TO WESTERN ELECTRIC COMPANY, INCORPORATED, OF NEW YORK, N. Y., A CORPORATION OF NEW YORK.

METHOD OF AND MEANS FOR PROTECTING ELECTRICAL APPARATUS.

Application filed November 12, 1923. Serial No. 674,199.

This invention relates to a method of and means for protecting electrical apparatus from the effects of an abnormal flow of current in a circuit including the apparatus.

This invention contemplates an arrangement for automatically increasing the resistance of a circuit and thereby decreasing the current so that the current flowing in the circuit is maintained at a predetermined low value until the cause of the abnormal condition has been located and proper precautions taken to insure against its recurrence when the circuits are restored to normal operating conditions.

Three electrode discharge devices have been applied very extensively in various arts, particularly in the communication art, with a tendency toward the employment of larger and more costly devices of this type, particularly for oscillators, amplifiers, modulators and radio telephone and telegraph transmitters. Under certain conditions, if the discharge devices fail to operate for the purpose intended, an excessive current may be set up in the circuits associated with them and in the devices themselves which may be thereby destroyed or rendered valueless in a very short time.

In accordance with one feature of the present invention, the automatic control of the resistance of the circuit is accomplished by controlling the conductivity of the space current path existing between the cathode and anode of an electric discharge device in response to abnormal current conditions either in a circuit of the device or in another circuit.

It is a well-known characteristic of electric discharge devices having three electrodes that the space current or cathode anode current is dependent upon the relative potentials of the cathode and the control electrode or grid. If the control electrode is made sufficiently negative with respect to the cathode, the space current is reduced to zero and the effective resistance of the path between the cathode and the anode approaches infinity. By fixing definitely the relative potentials of the cathode and control electrode, the device may be used to prevent the transmission of a current of more than a predetermined value through a circuit in which it is included.

The present invention provides an arrangement which is responsive to abnormal current flow in the circuit to be protected for automatically fixing the relative potentials of the cathode and control electrodes of a discharge device included in said circuit to thereby limit the current flowing through this circuit to a predetermined safe value. While the arrangement is capable of quite general application, it is particularly adapted for use with electric discharge devices, whereby such devices may be rendered self-protecting.

Figure 2:
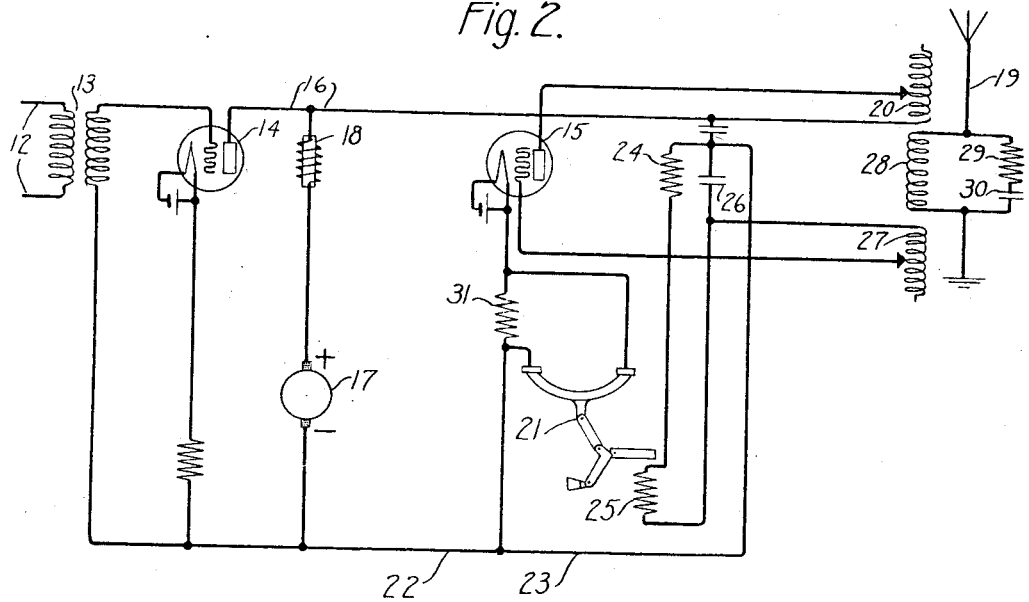

For an understanding of the present invention, and the operation of its various parts, reference may be had to the following description taken in connection with the attached drawing, in which Fig. 1 shows the invention applied to a simple vacuum tube circuit of general application, and Fig. 2 as applied to a radio signal transmitting circuit.

In Fig. 1, there is shown an electric discharge device comprising a container 1, enclosing a cathode 2, a control electrode, or grid 3 and an anode 4. Heating current is supplied to the cathode 2 by a source 5.

As is well known when the cathode has been heated, if the grid 3 is not more negative than the filament, a space current will flow between the cathode and anode and through the external circuit connected to these electrodes. This circuit is commonly referred to as the plate or output circuit of the device. In the present instance, the plate circuit may be traced from the positive side of a suitable source of current 7, the actuating or control winding of a circuit breaker 8, the primary winding of the transformer 9, the plate 4, the cathode 2 and the contacts of the circuit breaker 8 to the negative terminal of the source 7. The input circuit of the device extends from the cathode 2 to the grid 3. This circuit includes the contacts of the circuit breaker 8 and secondary winding of the transformer 10.

In the normal operation of the device, changes in potential which may be induced in the secondary of the input transformer 10 due to the operation of an instrument such as a telephone transmitter or a telegraph key connected to the primary thereof, are impressed upon the control electrode or grid 3 and cause the current in the output circuit of the device to vary in accordance with the variations of potential impressed upon the grid. These variations may be utilized in a circuit including the secondary of the transformer 9.

The contacts of the circuit breaker 8 form a shunt about a resistance 11 which is connected between the filament and the negative side of the source 7. The resistance 11 is therefore included in a conductive path which is common to both the input and output circuits of the device 1. The circuit breaker 8 is adjusted to open its contacts in response to the flow of circuit in excess of a predetermined value in the plate circuit. It follows, therefore, that, if for any reason, current in the plate circuit exceeds the predetermined value, the circuit breaker 8 will operate to remove the shunt about the resistance 11. As soon as the shunt circuit is opened, the grid 3 will be directly connected to the negative terminal of the source 7 while the cathode 2 will connect to this terminal through the resistance 11. Plate current will therefore flow through the resistance 11, and hence the grid 3 will be more negative than the cathode 2 by the drop of potential across this resistance. The resistance 11 is so chosen that the potential difference, thereby impressed upon the grid, will be sufficient to reduce the current flow between the cathode and plate either to zero or to some safe predetermined value.

In Fig. 2, there is shown a radio signal system comprising a modulator 14 and an oscillator 15. The modulator and oscillator are herein shown by way of example as electric discharge devices, each comprising a container enclosing a cathode, a grid or control electrode and an anode. The modulator 14 and the oscillator 15 have their plates connected together by a conductor 16 which is connected to a common plate supply source 17 through a choke coil 18.

The choke coil 18 is so chosen that the total current supplied by the source 17 to the parallel connected space paths of the oscillator and modulator is maintained substantially constant.

Low frequency signaling or modulating currents flowing through the circuit 12 are impressed upon the input circuit of the modulator 14 to produce in its output circuit a signal modulated direct current which is supplied to the plate circuit of the oscillator to generate modulated carrier waves. By this arrangement, a carrier wave modulated in amplitude in accordance with the low frequency signaling currents is generated and radiated from the antenna 19.

The arrangement for producing modulated carrier waves described above is similar to that disclosed in U. S. Patent 1,442,147, January 16, 1922 to R. A. Heising, to which reference may be made for a complete description of its operation.

The plate circuit of the oscillator 15 may be traced from the positive terminal of the source 17, choke coil 18, conductor 16, inductance 20, across the space between the plate and cathode to the oscillator 15, contacts of the circuit breaker 21 and conductor 22 to the negative terminal of the source 17.

The input circuit of the oscillator may be traced from the cathode, contacts of the circuit breaker 21, conductor 23, a leak path comprising the resistance 24 and control or actuating coil 25 of the circuit breaker 21 connected in series and a condenser connected in parallel to the resistance 24 and coil 25, inductance 27 to the grid of the oscillator.

The input and output circuits of the oscillator are coupled in feed-back relation by the inductance 28 which is inductively associated with the inductances 20 and 27. The inductance 28 is included in the antenna circuit 19 which, in general, serves to determine the frequency of the carrier waves generated by the oscillator 15. A static leak path is included in the antenna circuit. This path comprises a series connected resistance 29 and condenser 30, and is connected in shunt to the coil 28.

A resistance 31 is connected between the cathode of the oscillator 15 and the common terminal of the conductors 22 and 23, and hence is included in a conductive path common to the input and output circuits of the oscillator 15.

In the normal operation of the system described above, the resistance 31 will be shunted by the contacts of the circuit breaker 21. However, should an abnormal potential of positive sign be impressed upon the grid of the oscillator, as for example, when the circuit ceases to oscillate, current will flow through the input circuit of the oscillator including the actuating coil 25 of the circuit breaker 21. By adjusting the circuit breaker so that it will operate when the amplitude of the current flowing through the grid circuit reaches a selected value the relative values of the potentials respectively impressed upon the grid and anode of the oscillating device 15 may be fixed. The impression of a positive potential upon the grid of the oscillating device in excess of the selected value would cause the amplitude of the current flowing through the plate circuit of the device 15 and hence between its cathode and anode, to increase beyond a predetermined value which may be safely transmitted across the space within the device.

When the grid of the oscillating device 15 is positively polarized beyond the selected value, the circuit breaker 21 will be operated to remove the shunt around the resistance 31, and this resistance will be included in the conductive path common to the input and output circuits of the oscillator. When this occurs, the negative terminal of the source 17 will be connected to the grid of the oscillator through the leak resistance 24 and the cathode of the oscillator will be connected to the negative terminal of the source 17 through the resistance 31. Space current will flow through the resistance 31 to set up a difference of potential across this resistance. The grid of the oscillator will therefore be more negative than its cathode by the voltage drop across the terminals of the resistance 31.

By selecting a resistance 31 of such value that the potential difference between its terminals is relatively large, the current discharged across the space within the oscillating device 15 will be reduced either to zero or to a safe value, whereby damage to or destruction of the oscillating device will be prevented.

From the preceding description, it will be apparent that this invention provides an arrangement for automatically rendering an electric discharge device self-protecting and for using the device to predetermine the value of the current which may be supplied to electrical apparatus.

While the invention has been herein described with reference to signaling, for the purpose of completely and clearly disclosing its nature, it will be appreciated that this invention may be applied generally to arrangements for predetermining the maximum amplitude of the current which may be supplied to electrical apparatus, and hence may be used in any circuit where this effect is desired, such as, for example, in power circuits. It is therefore to be understood that this invention is not limited to the use or specific arrangements described above, but only by the scope of the appended claims.

What is claimed is:

1. The method of protecting electrical apparatus from abnormal current in a circuit including an electric discharge device and its associated input and output circuits having a common portion, which comprises utilizing an effect produced by the flow of abnormal current in one of said circuits to initiate the supply of current to said common portion, whereby the relative potentials impressed upon the electrodes of the device are regulated and the current supplied to the apparatus is limited to a safe value.

2. The method of protecting electrical apparatus from abnormal current flow in a circuit including a space discharge device having a cathode, an anode and an impedance control element and input and output circuits having a common portion associated with the device, which comprises causing the flow of abnormal current in one of said circuits to initiate the supply of current to said common portion, whereby the relative potentials impressed upon the anode and control electrode are varied to reduce the space current flowing through the device to a safe value.

3. The method of protecting electrical apparatus from abnormal currents in a circuit including a space discharge device and associated input and output circuits having a common portion, said device having a cathode an anode, an impedance control electrode which comprises causing excessive current flow through one of said circuits to initiate the supply of current to said common portion, whereby a polarizing potential is impressed upon the control electrode to reduce the current discharged across the space within said device to a safe limit.

4. The method of protecting electrical apparatus from abnormal currents in a circuit including a space discharge device and associated input and output circuits having a common portion, said device having a cathode, an anode, an impedance control electrode which comprises causing current to flow in a circuit including the space path between the anode and cathode and causing an abnormal change in said current to initiate the supply of current to said common portion, whereby a polarizing potential is impressed upon the control electrode of the device to render the space path substantially non-conductive.

5. Protective means for an electric circuit including an electric discharge device, input and output circuits therefor, having a common portion, said device having a cathode, an anode and a grid, and means included in one of said circuits for initiating the supply of current to said common portion, whereby the space current of said device is prevented from exceeding a predetermined value.

6. Protective means for an electric circuit including an electric discharge device comprising a cathode, an anode, a grid, and input and output circuits for said device, a circuit breaker included in one of said circuits, and means controlled by said circuit breaker for preventing the space current of said device from exceeding a predetermined value.

7. Protective means for an electric circuit including an electric discharge device comprising a cathode, an anode, a grid, and input and output circuits for said device, and a circuit breaker having its contacts in said circuits and actuated by current in one of said circuits for controlling means to prevent the space current flowing through said device from exceeding a predetermined value.

8. In combination, a circuit to be protected, including a space discharge device having three electrodes and external circuits associated therewith, means common to said external circuits for controlling the relative values of the potentials impressed upon two of the electrodes of said device, and means controlled by current flow in one of said circuits for supplying current to said common means for limiting the space current flowing through said device to a safe value.

9. In combination, a circuit to be protected, including a space discharge device having an anode, a cathode, an impedance control electrode and external circuits associated therewith, means common to said external circuits for controlling the relative values of the potentials impressed upon said anode and said control electrode, and means controlled by current flowing in the circuit including said anode and cathode for supplying current to said common means controlling the potentials for limiting the space current through said device to a safe value.

10. In combination, a circuit to be protected, including a space discharge device having an anode, a cathode, an impedance control electrode and external circuits associated therewith, and a circuit breaker included in said external circuits for controlling means whereby the relative value of the potentials impressed upon said anode and said control electrode is changed to limit the space current flowing through the device to a safe value.

11. In combination, a circuit to be protected including a space discharge device having an anode, a cathode and an impedance control electrode and external circuits associated therewith, and a circuit breaker adapted to be actuated by abnormal current flowing in one of said external circuits for controlling means whereby the impedance of the space discharge path is increased and the space current flowing through the device is reduced to a safe value.

12. In combination, a circuit to be protected including a space discharge path and input and output circuits associated therewith, means for controlling the impedance of said discharge path, and means sensitive to the flow of excessive current in one of said external circuits for supplying current to the means for controlling the said impedance of said device to limit the space current to a safe value.

13. Protective means for a circuit including an electric discharge device having a cathode, an anode and a grid, input and output circuits associated with said device, said output circuit including a space current source, a resistance included in a conductive path common to said input and output circuits, and means under the control of one of said circuits for rendering said common path conductive of space current, whereby the space current for said device is prevented from exceeding a predetermined value.

14. Protective means for a circuit including an electric discharge device having a cathode, an anode and a grid, input and output circuits associated with said device, said output circuit including a space current source, a resistance including in a conductive path common to said input and output circuits, and means under the control of one of said circuits for rendering said common path conductive of space current and to impress the potential difference across said resistance upon the control electrode of said device.

15. Protective means for a circuit including an electric discharge device having a cathode an anode and a grid, input and output circuits associated with said device, said output circuit including a space current source, a resistance included in a conductive path common to said input and output circuits, and a circuit breaker, controlled by one of said circuits, for supplying space current to said resistance, whereby the current discharged across the space within said device is prevented from exceeding a predetermined value.

16. Protective means for a circuit including an electric discharge device having a cathode, an anode and a grid, input and output circuits associated with said device, said output circuit including a space current source, a resistance included in a conductive path common to said input and output circuits, and a circuit breaker, controlled by one of said circuits, for supplying space current to said resistance and for impressing the potential drop across said resistance upon the grid of said device.

17. A self-protecting apparatus comprising an electric discharge device including a cathode, an anode, a grid, and input and output circuits therefor, and means adapted to be energized by the flow of abnormal current in one of said circuits for controlling means common to said circuits for impressing a blocking potential upon said grid.

18. A self-protecting apparatus comprising an electric discharge device including a cathode, an anode, a grid, and input and output circuits therefor, and a circuit breaker adapted to be energized by the flow of abnormal current in one of said circuits for controlling means common to said circuits for impressing a blocking potential upon said grid.

In witness whereof, I hereunto subscribe my name this 5th day of November A. D., 1923.

LEWIS M. CLEMENT.